United States Patent
Ho et al.

(10) Patent No.: US 7,811,012 B2
(45) Date of Patent: Oct. 12, 2010

(54) SLIDING MECHANISM FOR USE IN PORTABLE ELECTRONIC DEVICE

(75) Inventors: Po-Feng Ho, Taipei Hsien (TW); Chang-Hai Gu, Shenzhen (CN); Guo-Yong Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 277 days.

(21) Appl. No.: 12/164,258

(22) Filed: Jun. 30, 2008

(65) Prior Publication Data

US 2009/0235590 A1  Sep. 24, 2009

(30) Foreign Application Priority Data

Mar. 18, 2008  (CN) .................. 2008 1 0300618

(51) Int. Cl.
*G03B 17/00* (2006.01)
*H04N 5/225* (2006.01)
(52) U.S. Cl. .................. 396/439; 396/448; 348/207.99
(58) Field of Classification Search .................. 396/439
See application file for complete search history.

(56) References Cited

U.S. PATENT DOCUMENTS

| 2,970,425 | A | * | 2/1961 | Foard ........................... 57/119 |
| 6,160,961 | A | * | 12/2000 | Tanabe ........................ 396/177 |
| 7,239,806 | B2 | * | 7/2007 | Chen ........................... 396/301 |
| 2004/0041935 | A1 | | 3/2004 | Nagamine et al. ........... 348/335 |
| 2006/0192890 | A1 | | 8/2006 | Watanabe et al. ............ 348/373 |
| 2007/0109413 | A1 | * | 5/2007 | Chang .................... 348/207.99 |
| 2009/0244879 | A1 | * | 10/2009 | Wang ............................ 362/3 |

FOREIGN PATENT DOCUMENTS

| CN | 1208884 A | 2/1999 |
| CN | 1831629 A | 9/2006 |
| CN | 1839553 A | 9/2006 |
| JP | 2006-121221 A | 5/2006 |
| WO | 2006/006776 A1 | 1/2006 |
| WO | WO 2006/006776 A1 * | 1/2006 |

\* cited by examiner

*Primary Examiner*—Melissa J Koval
(74) *Attorney, Agent, or Firm*—Steven M. Reiss

(57) ABSTRACT

A sliding mechanism (100) used in a portable electronic device (200) is provided. The sliding mechanism includes a sliding member (12). The sliding member includes a cover portion (121) and two sliding rails (123). The cover portion is made of a plastic material that can be electro-plated. The sliding rails are made of another plastic material that has a low coefficient of friction.

20 Claims, 5 Drawing Sheets

SLIDING MECHANISM FOR USE IN PORTABLE ELECTRONIC DEVICE

BACKGROUND

1. Field of the Invention

The exemplary invention relates to sliding mechanisms, used in portable electronic devices.

2. Description of Related Art

Sliding mechanisms are typically used in a portable electronic device for various purposes. For example, the sliding mechanism is used to connect the base body and the cover body of a slide-type portable electronic device and driving the cover body to slide with respect to the base body.

Another sliding mechanism may protect a camera module used in a portable electronic device. The sliding mechanism includes a sliding member as a protective cover. The lens of the camera module is covered and protected by the protective cover when the protective cover is in its "closed" position. Thus, the camera module may maintain a relatively high imaging performance because the camera module is not subjected to negative influences such as being contaminated by dust in the air. When the camera module is used, the protective cover slides to its "open" position to expose the lens for imaging.

To achieve an aesthetic appearance, the protective cover may be electro-plated, forming a metallic layer thereon. However, the metallic layer makes the protective cover relatively hard.

Therefore, there exist a room for improvement within the art.

BRIEF DESCRIPTION OF THE DRAWINGS

Many aspects of the exemplary sliding mechanism for use in a portable electronic device can be better understood with reference to the following drawings. These drawings are not necessarily drawn to scale, the emphasis instead being placed upon clearly illustrating the principles of the exemplary sliding mechanism for use in the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
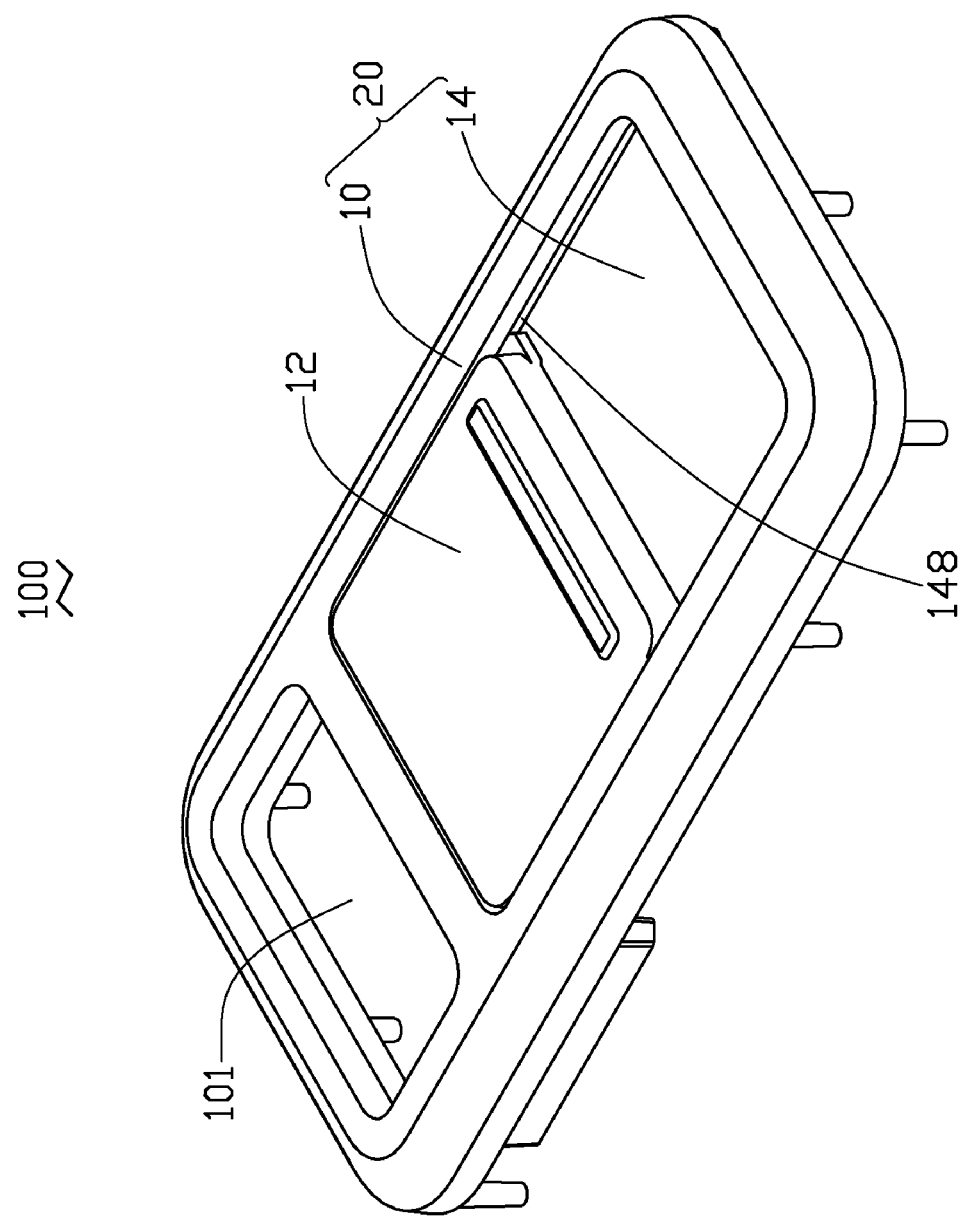
FIG. 1 is an assembled view of a sliding mechanism for use in a portable electronic device according to an exemplary embodiment.
Figure 2:
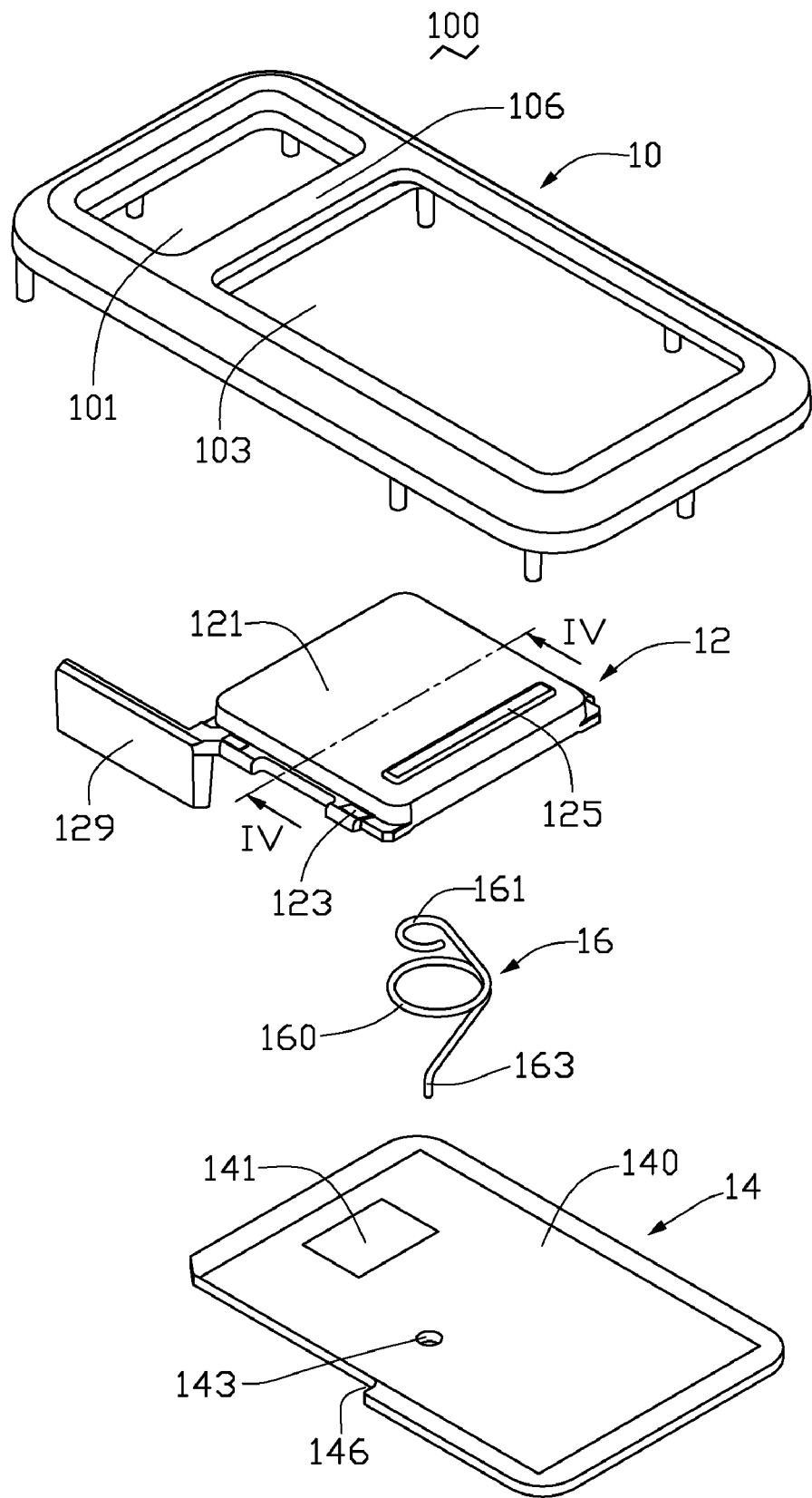
FIG. 2 is an exploded view of the sliding mechanism shown in FIG. 1.
Figure 5:
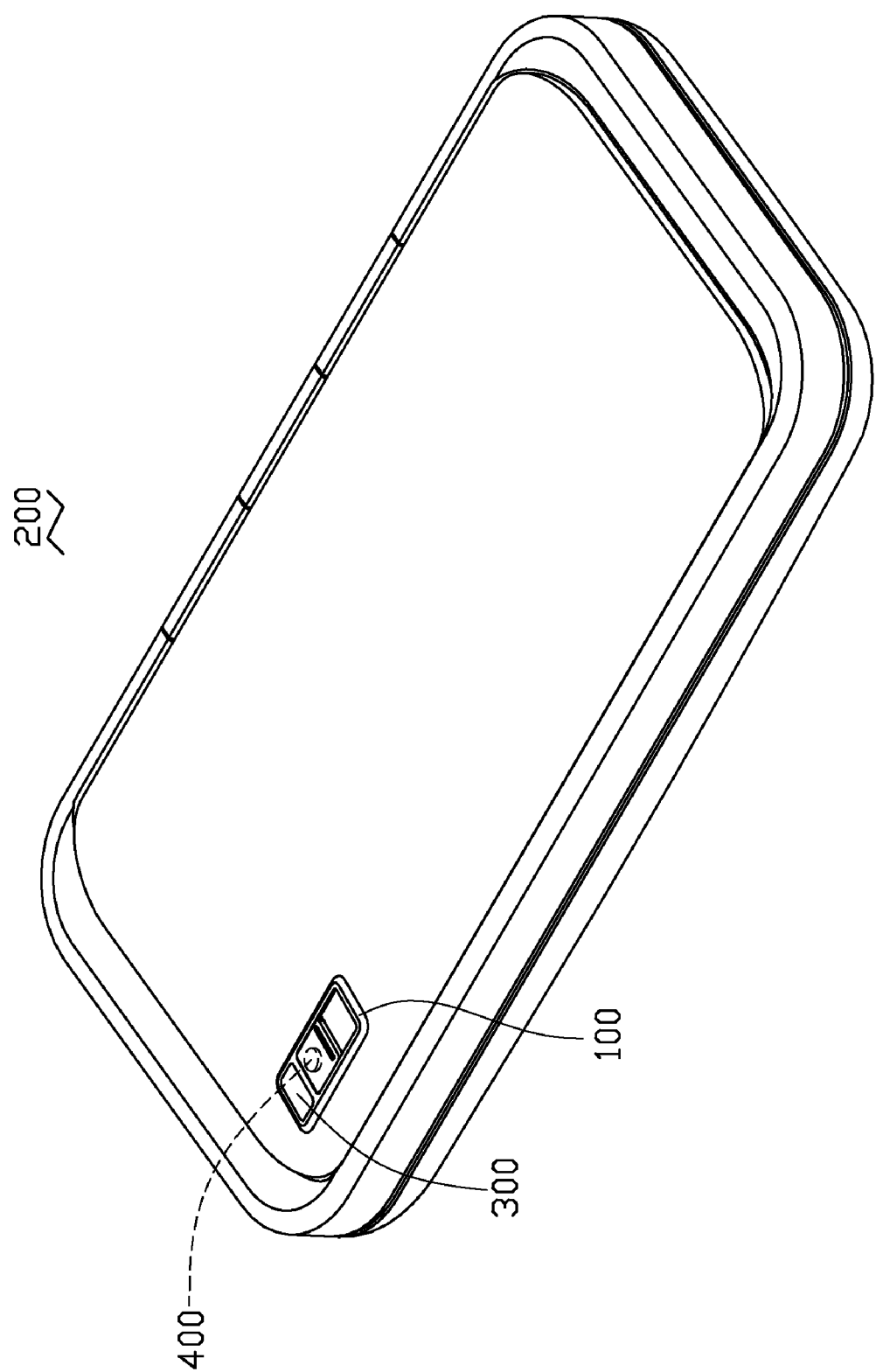
FIG. 5 is an isometric view of the portable electronic device incorporating the sliding mechanism shown in FIG. 1.

Referring to FIGS. 1 and 2, the sliding mechanism 100 is exemplified to illustrate the principle of the exemplary embodiment. The sliding mechanism 100 is integrated into a portable electronic device 200 (FIG. 5) and includes a base 20, a sliding member 12, and an elastic member 16. The elastic member 16 facilitates sliding of the sliding member 12 relative to the base 20.

The base 20 includes a base portion 10 and a holding portion 14 (FIG. 2) attached to the base portion 10.

The base portion 10 is a generally rectangular frame and defines a first opening 101 and a second opening 103, separated by a dividing portion 106. The first opening 101 is smaller than the second opening 103 and configured for exposing a lamp 300 of the portable electronic device 200 (shown in FIG. 5).

Figure 3:
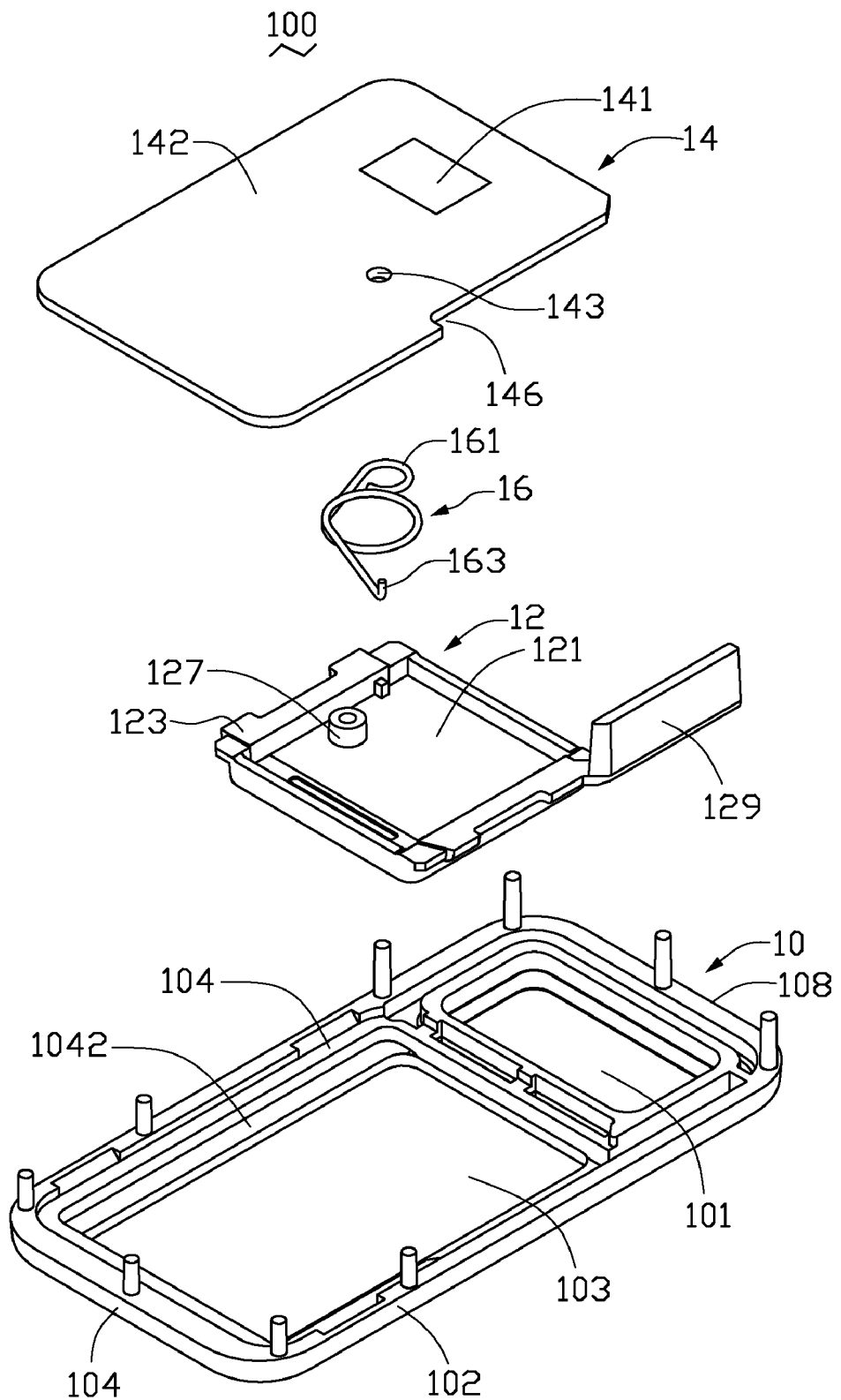
FIG. 3 is another exploded view of the sliding mechanism shown in FIG. 1, view from a differential angle from that of FIG. 2.

Referring to FIG. 3, the base portion 10 includes an interior wall 104 defining the second opening 103. The interior wall 104 has two generally step-shaped wall portions 1042 located opposite to each other.

The holding portion 14 is generally rectangular and includes an upper wall 140, a lower wall 142, and a recessed sidewall 146. The upper wall 140 has substantially same size and shape as the second opening 103 so the holding portion 14 can be securely received within the second opening 103 with the upper wall 140 attached by the two wall portions 1042 to the base portion 10. As attached, two sliding grooves 148 can be accordingly defined between the two wall portions 1042 and the two ends of the upper wall 140. The upper wall 140 has a light-penetrating hole 141 and a mounting hole 143 defined therein. The mounting hole 143 is configured for securing one end of the elastic member 16. The light-penetrating hole 141 is configured for allowing incident light there through. The recessed sidewall 146 is configured for facilitating sliding or the sliding member 12.

Figure 4:
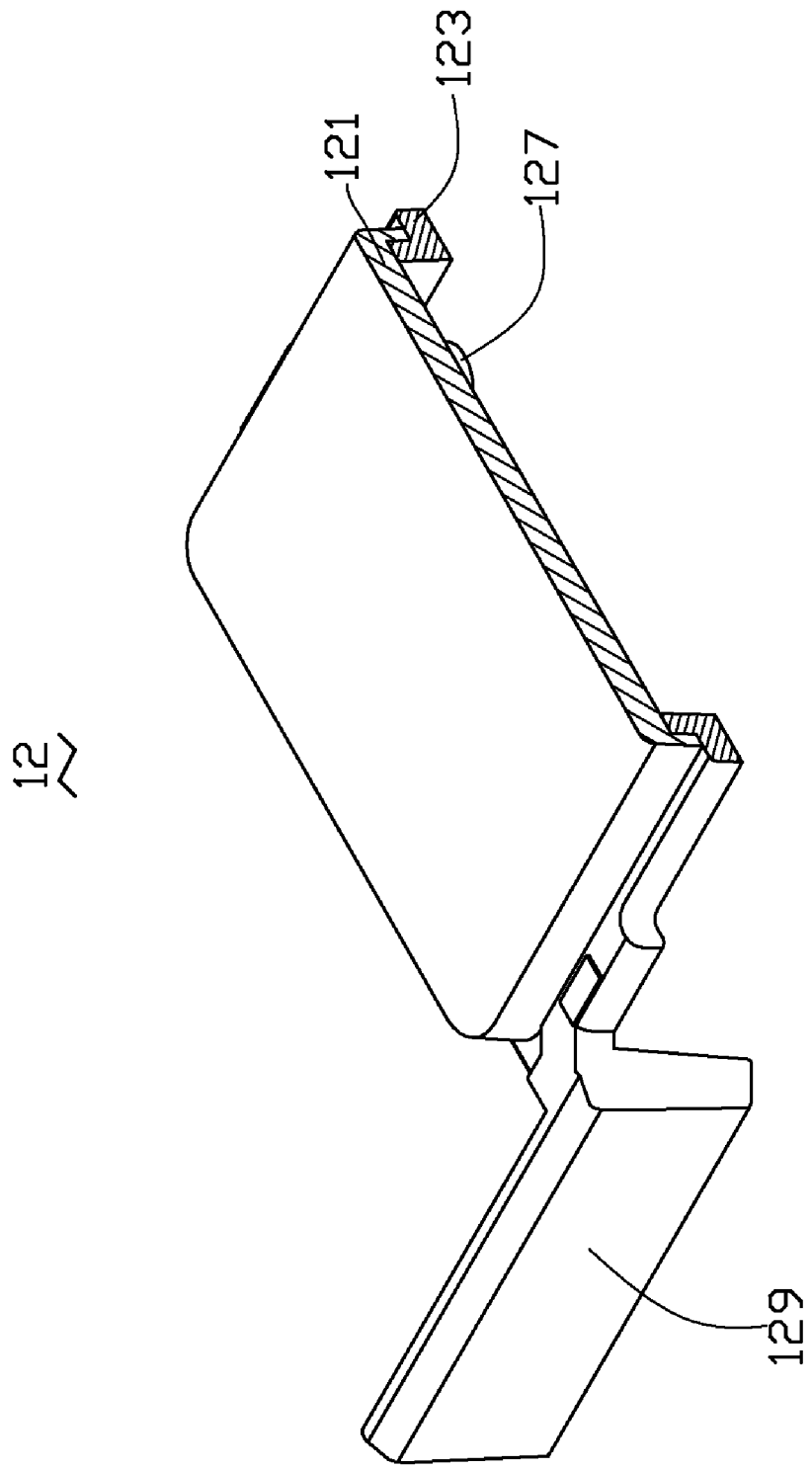
FIG. 4 is a cut-away view of a sliding member 12 of the sliding mechanism shown in FIG. 2, taken along a line IV-IV.

Referring to FIG. 4, the sliding member 12 includes a cover portion 121, two sliding rails 123, and a resisting portion 129.

The cover portion 121 has a securing portion 127 protruding therefrom. The securing portion 127 is generally cylindrical and for securing there other end of the elastic member 16. As the sliding member 12 is assembled with the base 20, the securing portion 127 faces the upper wall 140 of the holding portion 14. The cover portion 121 further has a manipulating portion 125 protruding therefrom. The manipulating portion 125 is located opposite to the securing portion 127. When the sliding member 12 is assembled with the base 20, the manipulation portion 125 is exposed to be operated/pushed along the wall portion 1042 of the base portion 10 by the user's finger.

The cover portion 121 can be made (e.g., molded) of a plastic material such as acrylonitrile-butadiene-styrene (ABS), or a mixture of polycarbonate and ABS. Such plastic materials can be electro-plated with a metallic layer.

A sliding rail 123 is formed (e.g., insert molded) on each of the two sides of the cover portion 121. The sliding rails 123 are trapped in the sliding grooves 148, allowing for the sliding of cover 121.

The two sliding rails 123 can be made (e.g., molded) of a plastic material such as a mixture of polycarbonate and polytetrafluoroe thylene (PTFE), or a mixture of polycarbonate and silicone oil. The polytetrafluoroe thylene is ranged from about five percentage to about fifteen percentage in the mixture. These plastic mixtures cannot be electro-plated with a metallic layer.

The resisting portion 129 generally extends from one end of one sliding rail 123. The resisting portion 129 extends away from the cover portion 121 and configured for engaging the recessed sidewall 146 of the holding portion 14 and sliding therealong.

The elastic member 16 can be a torsion spring with one loop portion 160 and a ring portion 161 formed on one end and a hook portion 163 formed on the other end. The loop portion 160 connects to the ring portion 161 and the hook portion 163. As the elastic member 16 is physically biased, the ring portion 161 and the hook portion 13 are simultaneously deformed, so that a torsion force can be created in the loop portion 160. The torsion force is used to restore the ring portion 161 and the hook portion 163 from their deformed position to their original position. The ring portion 161 encircles the securing portion 127 and secures the ring end of the elastic member 16 with the securing portion 127. The hook portion 163 corresponds with the mounting hole 143 and hooks into the mounting hole 143; securing the other end of the elastic member 16 with the holding portion 14.

During assembly of the sliding mechanism 100, the sliding member 12 is received within the second opening 103. The cover portion 121 of the sliding member 12 exposes through the second opening 103 and each sliding rail 123 contacts one wall portion 1042. The ring portion 161 encircles and is secured to the securing portion 127.

The holding portion 14 is securely attached to the second opening 103 with the upper wall 140 securely positioned by the two wall portions 1042. Because the two wall portions 1042 are step-shaped, when sliding mechanism 100 is assembled, each sliding rail 123 is trapped in a sliding groove 148 formed between a wall portion 1042 and an end of the upper wall 140. Then, the resisting portion 129 is engaged with the recessed sidewall 146 of the holding portion 14. Thus, the sliding mechanism assembly of the sliding mechanism 100 is completed.

In use, the manipulating portion 125 is pushed by the user. The sliding member 12 slides within the second opening 103 from one end of the second opening 103 near the dividing portion 106 to the other. The ring portion 161 and the hook portion 163 are deformed to generate torsion force. The sliding member 12 is further stopped by a stopping means (not shown) against the torsion force. When the stopping means is released, the torsion force urges the sliding member 12 slides back towards and then stopped by the dividing portion 106.

As mentioned above, two different types of materials can be selected for making the cover portion 121 and each sliding rail 123, respectively. One material reduces friction while the other material allows electro-plating with a metallic layer to provide an improved aesthetic appearance to the sliding mechanism 100.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sliding mechanism for use in a portable electronic device, comprising:
   a base;
   a sliding member comprising a cover portion and two sliding rails, the two sliding rails formed on opposite sides of the cover portion, the cover portion made of a plastic material that can be electro-plated with a metallic layer, the two sliding rails made of another plastic material different from the plastic material for the cover portion and that cannot be electro-plated with a metallic layer, the sliding rails having a low coefficient of friction; and
   an elastic member connecting to the base and the sliding member and facilitating the sliding members ability to slide relative to the base.

2. The sliding mechanism as claimed in claim 1, wherein the material of the two sliding rails is selected from a group consisting of mixtures of polycarbonate and polytetrafluoroethylene (PTFE), and a mixture of polycarbonate and silicone oil.

3. The sliding mechanism as claimed in claim 2, wherein the polytetrafluoroethylene is ranged from about five percentage to about fifteen percentage in the mixture.

4. The sliding mechanism as claimed in claim 2, wherein the material of the cover portion is selected from a group consisting of acrylonitrile-butadiene-styrene, and mixtures of polycarbonate and acrylonitrile-butadiene-styrene.

5. The sliding mechanism as claimed in claim 2, wherein the base comprises a base portion and a holding portion secured to the base portion.

6. The sliding mechanism as claimed in claim 5, wherein the base portion defines adjacent first and second openings.

7. The sliding mechanism as claimed in claim 6, wherein an interior wall of the base portion encloses the second opening, the interior wall having two generally step-shaped wall portions, the two wall portions being located opposite to each other.

8. The sliding mechanism as claimed in claim 7, wherein the holding portion comprises an upper wall and a lower wall opposite to the upper wall, the holding portion being configured for being securely attached within the second opening with the upper wall secured to the two wall portions of the base portion, the base further comprising two sliding grooves defined between the two wall portions and the upper wall, the two sliding rails trapped in the two sliding grooves.

9. The sliding mechanism as claimed in claim 8, wherein the holding portion defines a mounting hole, the mounting hole being configured for mounting one end of the elastic member, the cover portion comprising a securing portion configured for mounting the other end of the elastic member.

10. The sliding mechanism as claimed in claim 9, wherein the elastic member comprises a circle portion, a ring portion, and a hook portion, the circle portion connecting to the ring portion and the hook portion, the circle portion creating an elastic force as the elastic member is deformed, the ring portion being configured for coiling around the securing portion, and the hook portion being configured for hooking into the mounting hole.

11. A portable electronic device, comprising:
   a camera module comprising a camera;
   a lightening lamp corresponding to the camera module; and
   a sliding mechanism comprising:
      a base;
      a sliding member comprising a cover portion and two sliding rails, the two sliding rails formed on opposite sides of the cover portion, the cover portion made of a plastic material that can be electro-plated with a metallic layer, the two sliding rails made of another plastic material different from the plastic material for the cover portion and that cannot be electro-plated with a metallic layer, the sliding rails having a low coefficient of friction; and
      an elastic member connecting to the base and the sliding member and facilitating the sliding members ability to slide relative to the base.

12. The sliding mechanism as claimed in claim 11, wherein the material of the two sliding rails is selected from a group consisting of mixtures of polycarbonate and polytetrafluoroethylene (PTFE), and a mixture of polycarbonate and silicone oil.

13. The sliding mechanism as claimed in claim 12, wherein the polytetrafluoroe thylene is ranged from about five percentage to about fifteen percentage in the mixture.

14. The sliding mechanism as claimed in claim 12, wherein the material of the cover portion is selected from a group consisting of acrylonitrile-butadiene-styrene, and mixtures of polycarbonate and acrylonitrile-butadiene-styrene.

15. The sliding mechanism as claimed in claim 12, wherein the base comprises a base portion and a holding portion secured to the base portion.

16. The sliding mechanism as claimed in claim 15, wherein the base portion defines adjacent first and second openings.

17. The sliding mechanism as claimed in claim 16, wherein an interior wall of the base portion encloses the second opening, the interior wall having two generally step-shaped wall portions, the two wall portions being located opposite to each other.

18. The sliding mechanism as claimed in claim 17, wherein the holding portion comprises an upper wall and a lower wall opposite to the upper wall, the holding portion being configured for being securely attached within the second opening with the upper wall secured to the two wall portions of the base portion, the base further comprising two sliding grooves defined between the two wall portions and the upper wall, the two sliding rails trapped in the two sliding grooves.

19. The sliding mechanism as claimed in claim 18, wherein the holding portion defines a mounting hole, the mounting hole being configured for mounting one end of the elastic member, the cover portion comprising a securing portion configured for mounting the other end of the elastic member.

20. The sliding mechanism as claimed in claim 19, wherein the elastic member comprises a circle portion, a ring portion, and a hook portion, the circle portion connecting to the ring portion and the hook portion, the circle portion creating an elastic force as the elastic member is deformed, the ring portion being configured for coiling around the securing portion, and the hook portion being configured for hooking into the mounting hole.

* * * * *